United States Patent
Fontaine et al.

(10) Patent No.: US 12,485,707 B2
(45) Date of Patent: Dec. 2, 2025

(54) HIGH CONTRAST PATTERNS FOR SIDEWALL OR TREAD

(71) Applicant: The Goodyear Tire & Rubber Company, Akron, OH (US)

(72) Inventors: Sebastien Willy Fontaine, Vichten (LU); Michel Jean Yves Windeshausen, Messancy (BE); Wendy Therese Frida El-Sebaly, Sankt-Vith (BE); Vincent Pierre David Bylda, Langsur (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/189,340

(22) Filed: Mar. 24, 2023

(65) Prior Publication Data

US 2023/0311583 A1    Oct. 5, 2023

Related U.S. Application Data

(60) Provisional application No. 63/327,294, filed on Apr. 4, 2022.

(51) Int. Cl.
*B60C 13/00* (2006.01)
(52) U.S. Cl.
CPC .................. *B60C 13/001* (2013.01)
(58) Field of Classification Search
CPC ................................................ B60C 13/001
See application file for complete search history.

(56) References Cited

U.S. PATENT DOCUMENTS

| | | |
|---|---|---|
| 2017/0259623 A1 | 9/2017 | Matsumoto |
| 2019/0047331 A1 | 2/2019 | Iwabuchi et al. |
| 2023/0067051 A1 | 3/2023 | Kamada |
| 2023/0234402 A1 | 7/2023 | Ishii |

FOREIGN PATENT DOCUMENTS

| | | | | |
|---|---|---|---|---|
| DE | 102008037483 A1 | * | 4/2010 | ............ B60C 13/001 |
| JP | 2002067619 A | * | 3/2002 | .......... B60C 11/0083 |
| JP | 2013071670 A | | 4/2013 | |
| JP | 2013244804 A | * | 12/2013 | |
| JP | 2014136487 A | | 7/2014 | |

OTHER PUBLICATIONS

JP 2002-067619 Machine Translation; Shibano, Keizo (Year: 2002).*
JP 2013-244804 Machine Translation; Yamakawa, Takahiro (Year: 2013).*
European Search Report for Serial No. EP23166219 dated Aug. 2, 2023.

* cited by examiner

*Primary Examiner* — Justin R Fischer
*Assistant Examiner* — Nicholas J Weiler
(74) *Attorney, Agent, or Firm* — Eryn Ace Fuhrer; June E. Rickey

(57) ABSTRACT

A tire having a high contrast design pattern is described, wherein one design has a first set of spaced apart wavy lines oriented in a first direction, and a second set of spaced apart wavy lines oriented in a first direction, wherein the first set of wavy lines is out of phase with the second set of wavy lines. A second high contrast design pattern is described, and is formed of a plurality of circles, wherein the plurality of circles do not overlap with each other and are tangent to each other.

6 Claims, 6 Drawing Sheets

HIGH CONTRAST PATTERNS FOR SIDEWALL OR TREAD

FIELD OF THE INVENTION

The present invention relates to a pneumatic tire that has an outer surface such as a sidewall or tread with a high contrast pattern.

BACKGROUND OF THE INVENTION

It is known in the art to have a tire with a sidewall surface that includes letters or numbers. Because the tire is typically made of rubber which has a black color, the letters or numbers can be difficult to read. Thus it is desired to have an improved pattern useful on the tire sidewall or tread surface that enhances the visibility of the sidewall, particularly letters and numbers which are in high contrast to the pattern. It is known to laser engrave the tire molds in order to form tufts, wherein a plurality of tufts may be used to form the high contrast pattern. However, the tips of these tufts may break during demolding. Thus it is desired to have an improved high contrast pattern without the use of tufts.

BRIEF DESCRIPTION OF THE DRAWINGS

The invention will be described by way of example and with reference to the accompanying drawings in which.

DETAILED DESCRIPTION OF THE INVENTION

Figure 2:
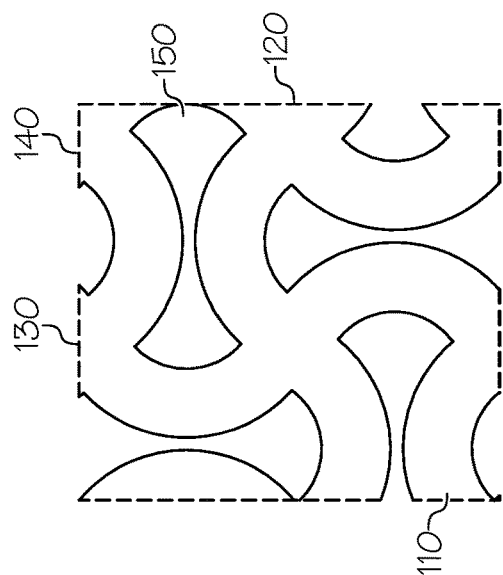
FIG. 2 is a close up view of the first embodiment of FIG. 1.
Figure 1:
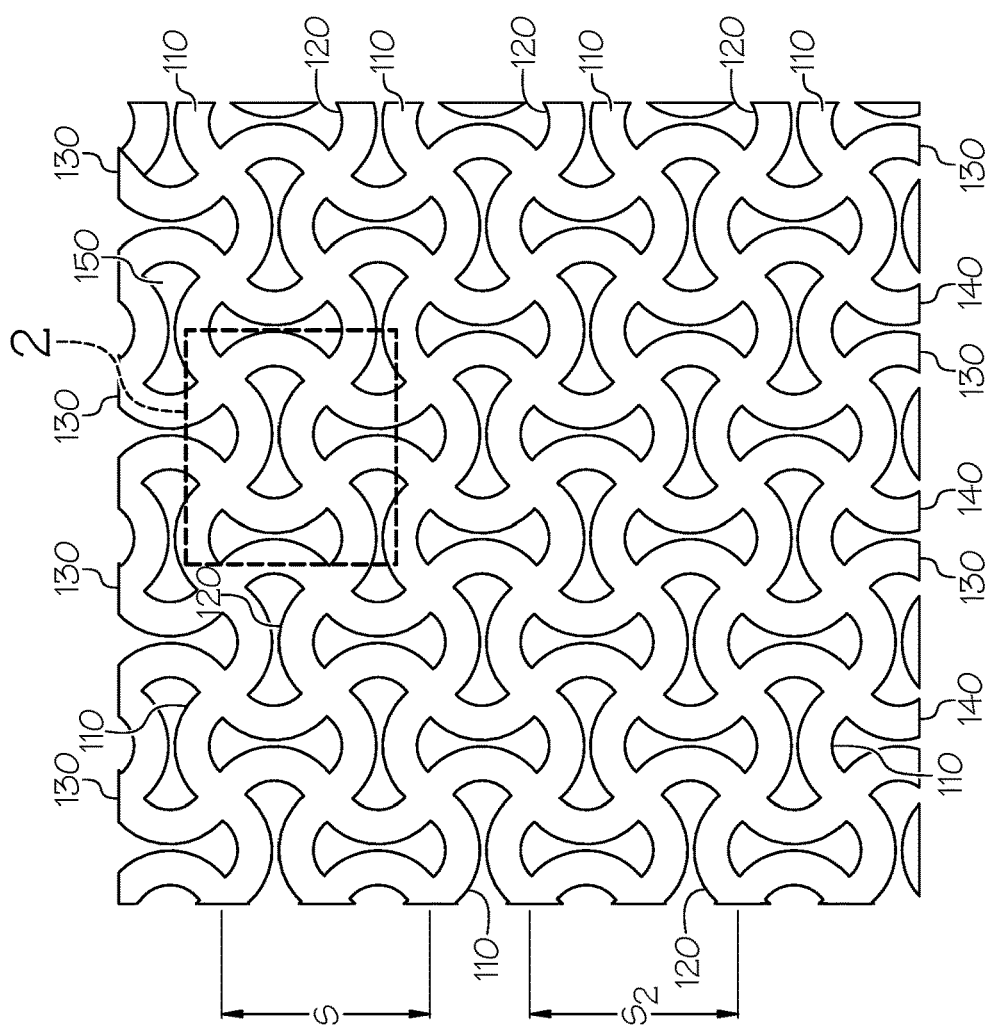
FIG. 1 is a first embodiment of a high contrast design.

FIG. 1 illustrates a first embodiment of a high contrast pattern 100 useful on the sidewall of the tire or on the tread pattern. The high contrast pattern 100 includes a first set of wavy lines 110 that are parallel and are spaced apart a distance S, where S is in the range of 0.1 mm to 2 mm, and more preferably in the range of 0.3 mm to 1.5 mm. The high contrast pattern 100 includes a second set of wavy lines 120 that are parallel and spaced apart a distance S2, wherein S2 is in the range of 0.1 mm to 2 mm, and more preferably in the range of 0.3 mm to 1.5 mm. The first and second set of wavy lines are out of phase of each other and are not parallel. Both the first and second set of wavy lines are oriented in a first or same direction. A neighboring wavy line of the first set is located in close proximity of less than 1 mm, more preferably less than 0.5 mm to an adjacent wavy line of the second set, and wherein the lines do not intersect. The second set of wavy lines is the mirror image of the first set of wavy lines, and when viewed together give an hourglass shape.

The first embodiment 100 of a high contrast pattern may optionally include a third and fourth set of wavy lines 130, 140 respectively. The third and fourth set of wavy lines are oriented in a second direction, preferably perpendicular to the first direction. The third set of wavy lines 130 alternate with the fourth set of wavy lines. The third set of wavy lines is out of phase with the fourth set of wavy lines. A neighboring wavy line of the third set is located in close proximity of less than 1 mm, more preferably less than 0.5 mm to an adjacent wavy line of the fourth set, and wherein the lines do not intersect. The third set of wavy lines is the mirror image of the fourth set of wavy lines, and when the adjacent wavy line of the third set is located adjacent the neighboring wavy line of the fourth set, a plurality of hourglass shapes 150 are formed.

Figure 4:
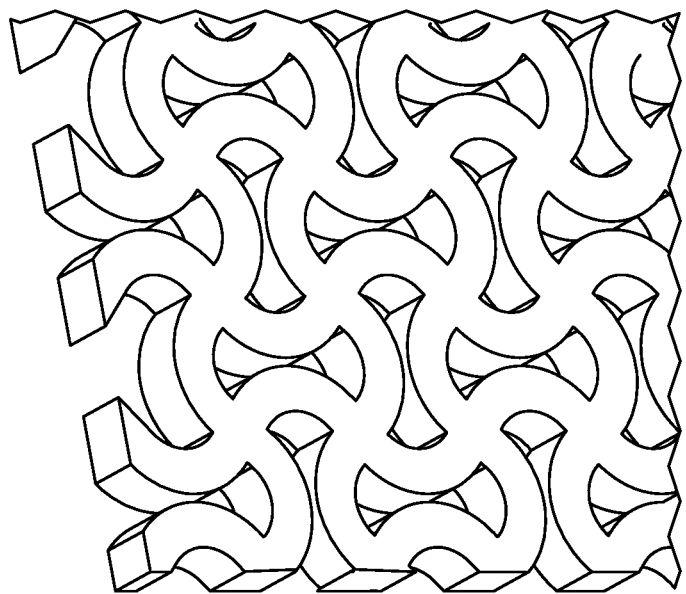
FIG. 4 is a closeup view of the pattern of FIG. 3.
Figure 3:
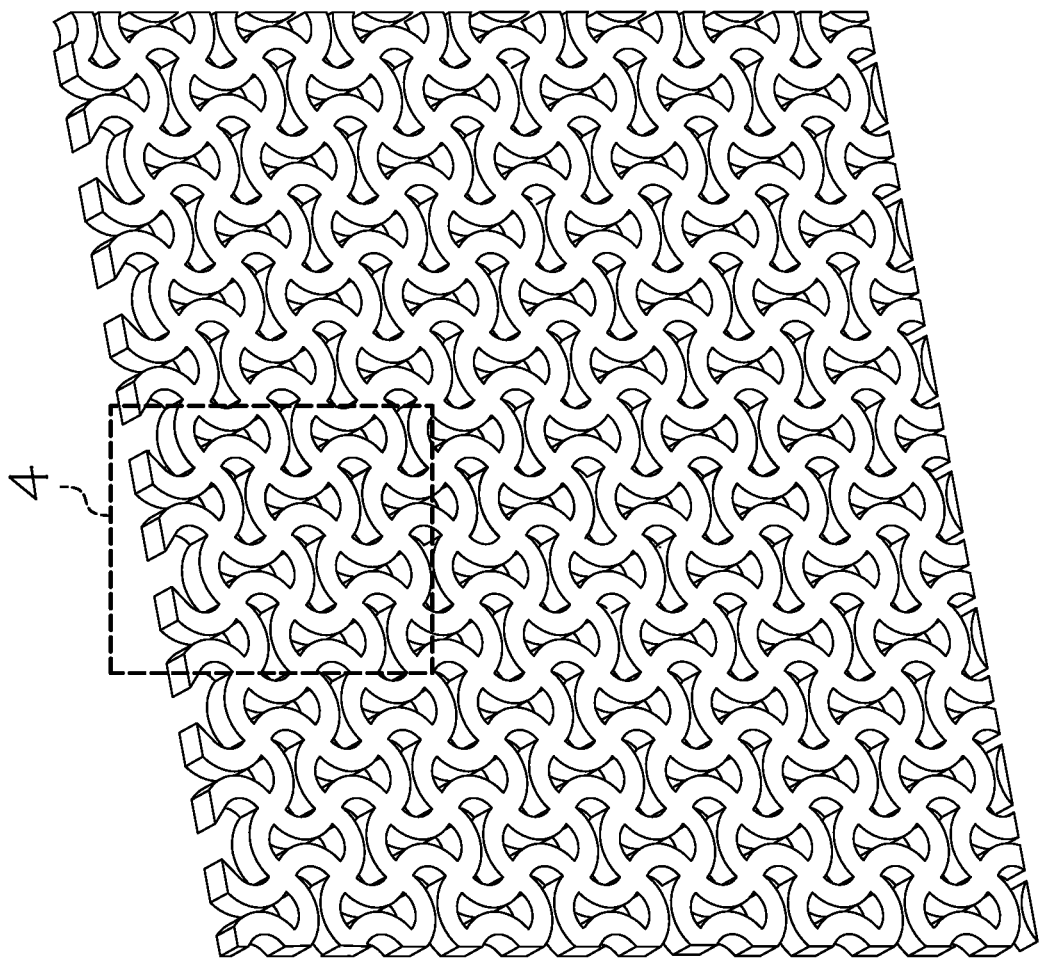
FIG. 3 is a perspective view of the first embodiment formed in rubber.

The high contrast wavy pattern may be formed in the tire mold in the sidewall or tread area, resulting in the high contrast pattern 100 projecting from the surface of the tire, as shown in FIGS. 3 and 4. The wavy lines 110,120, 130,140 may be laser engraved in the mold, and preferably have a thickness in the range of 0.1 to 0.4 mm. The height of the wavy lines preferably is in the range of 0.1 to 1 mm. The wavy lines taken together form a high contrast grid pattern, with nonparallel lines grouped together to form an aesthetically pleasing pattern.

Figure 5:
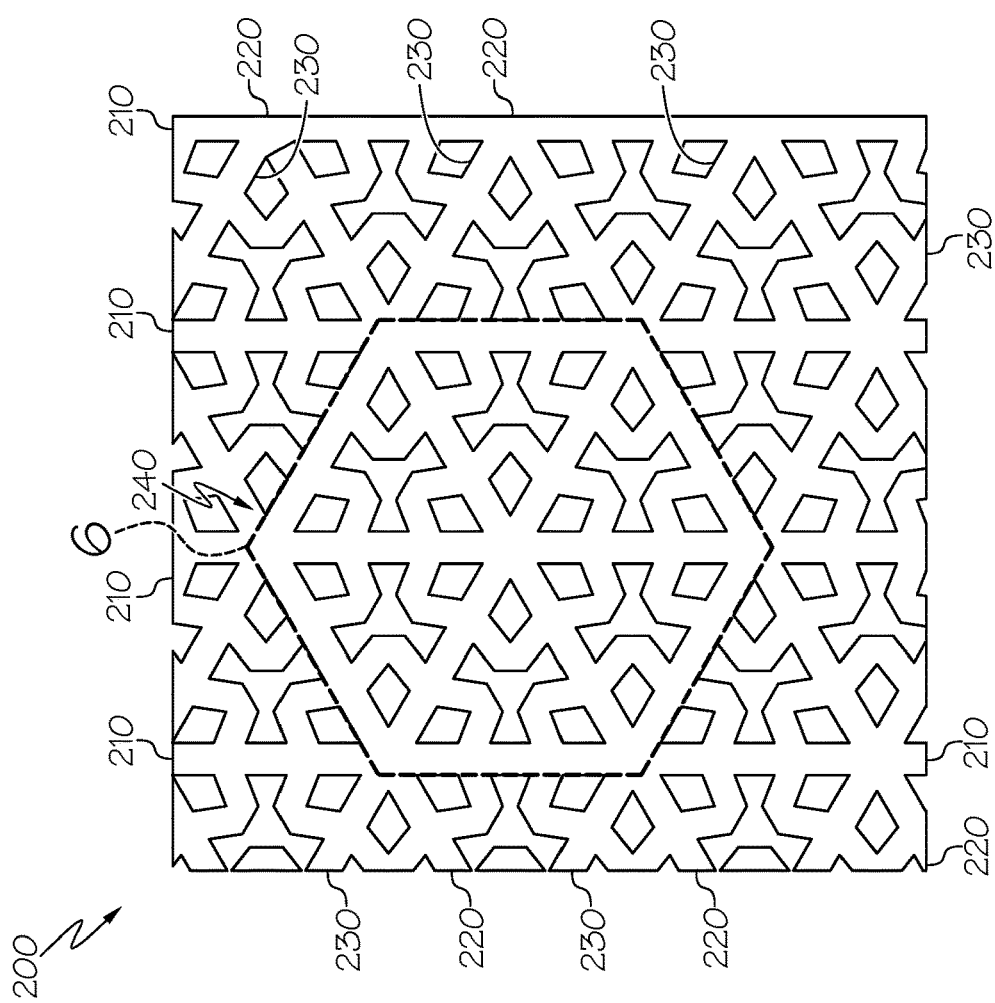
FIG. 5 is a second embodiment of a high contrast design.
Figure 6:
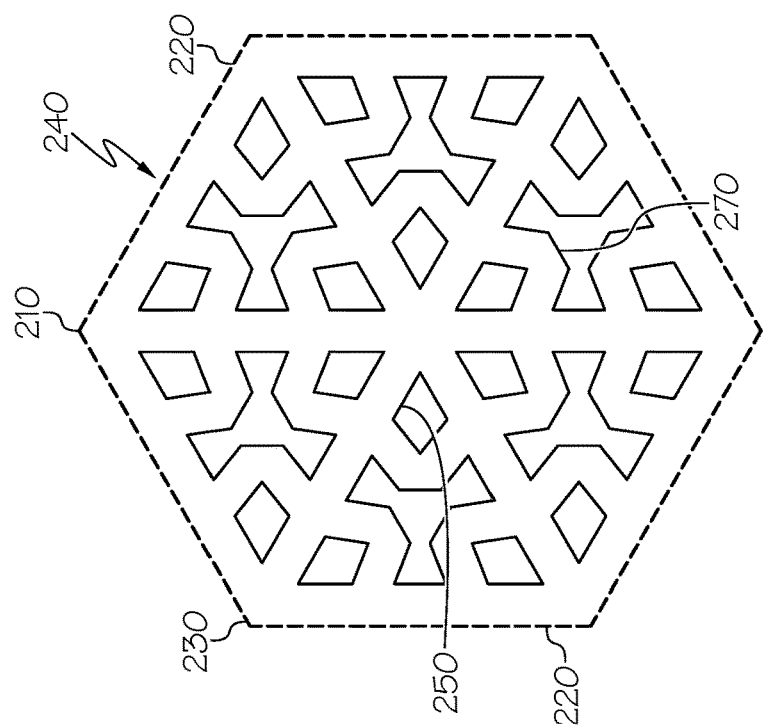
FIG. 6 is a close-up view of the second embodiment of FIG. 5.
Figure 7:
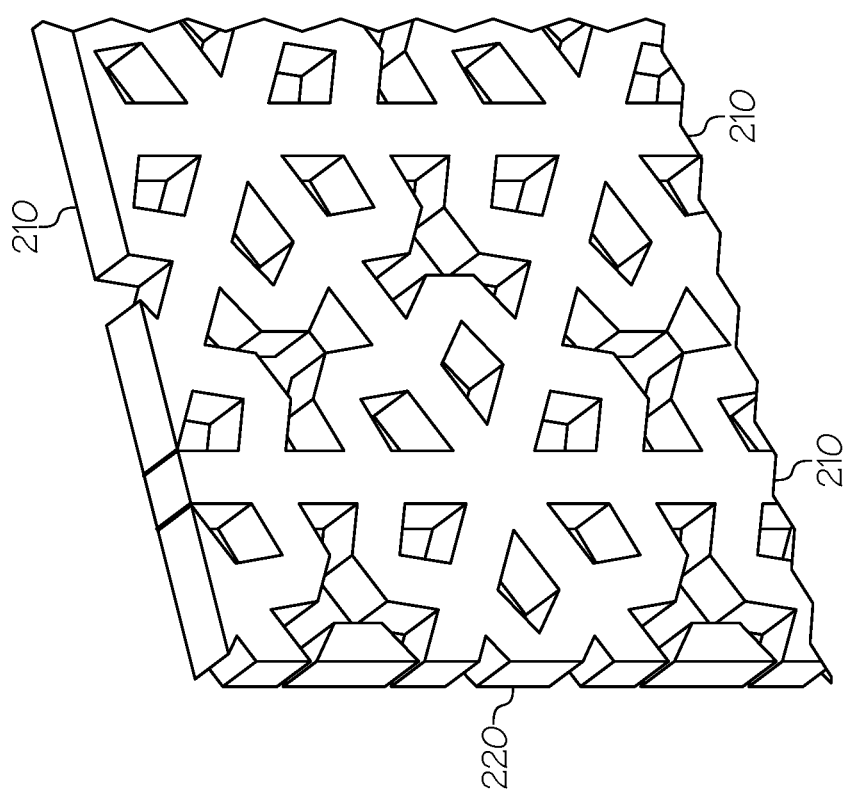
FIG. 7 is a perspective view of the second embodiment formed in rubber.
Figure 9:
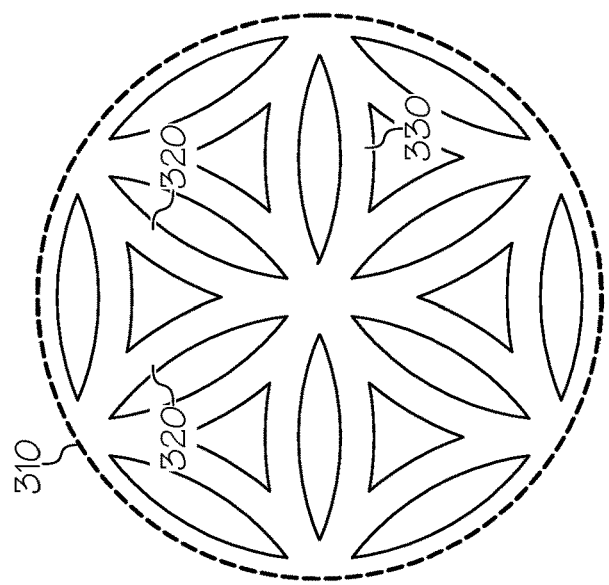
FIG. 9 is a closeup view of the third embodiment of FIG. 8.

FIGS. 5-7 illustrate a second embodiment of a high contrast pattern useful for on the tire sidewall or outer tread surface. The high contrast design pattern 200 includes a plurality of spaced apart parallel lines 210 that extend in a first direction. The spacing of the parallel lines are 1 mm or more, preferably 2 mm or more. The high contrast design pattern 200 includes a second set of spaced apart parallel lines 220 that extend in a second direction different than the first direction. The second set of lines 220 intersect with the first set of parallel lines 210 and forms an angle of 60 degrees. A third set of parallel lines 230 intersects both with the first set of parallel lines 210 and the second set of parallel lines 220, forming a hexagon shape 240 formed of six isocles triangles. At the intersection 250 of the first, second and third set of lines, a snowflake 260 is formed of a plurality of faceted lines arranged in a ring 270 to give the appearance of a snowflake 260. Thus, a plurality of snowflakes 270 are formed at each intersection of the first, second and third set of lines. FIG. 7 illustrates the grid design of the plurality of snowflakes 260 formed in rubber.

Figure 8:
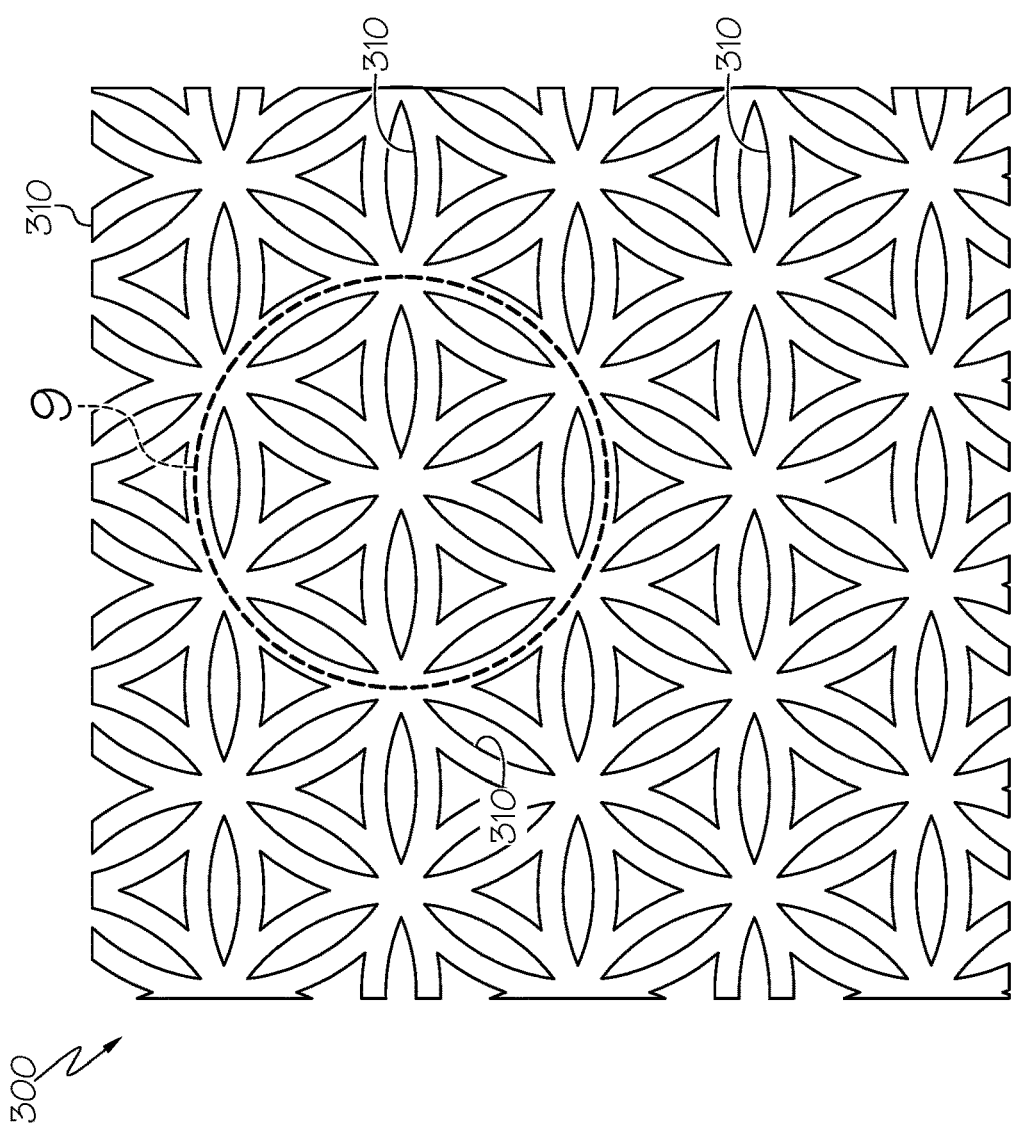
FIG. 8 is a third embodiment of a high contrast design.
Figure 10:
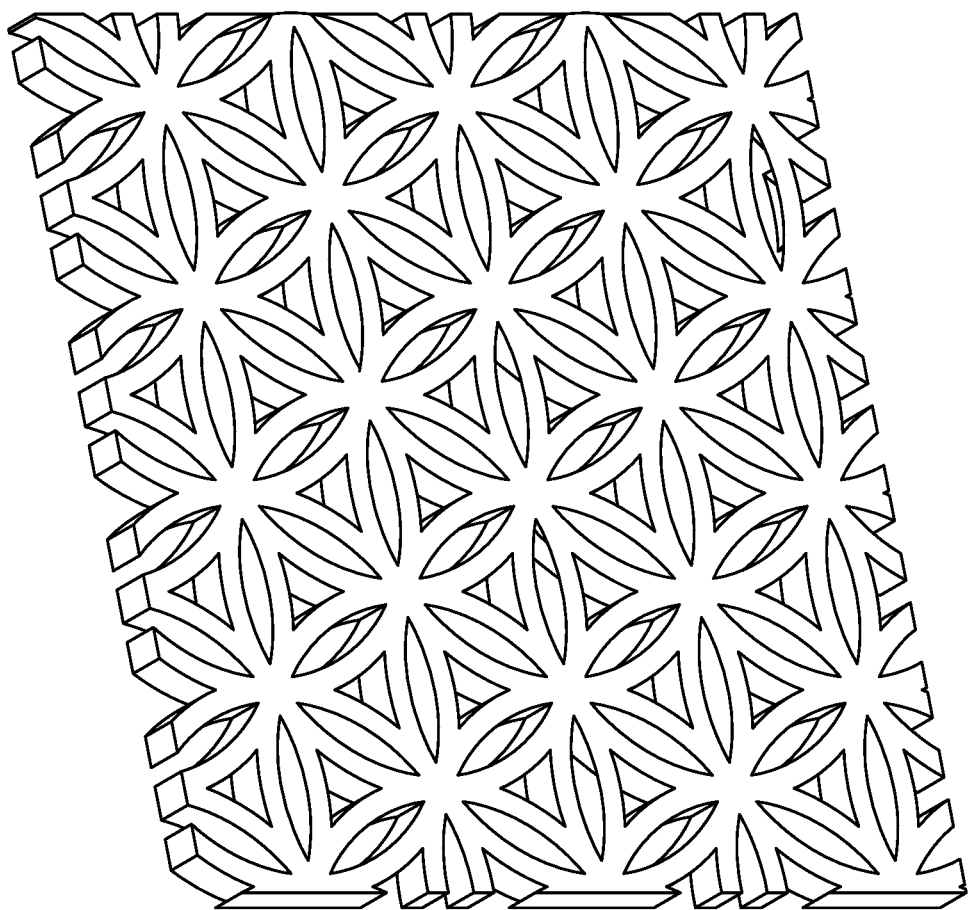
FIG. 10 is a closeup view of the third embodiment of a high contrast design formed in rubber.

FIG. 8 illustrates a third embodiment of a high contrast design 300 formed of a plurality of circles. A first set of circles 310 are formed that have centers aligned in parallel rows, with their edges tangent to circles in an adjacent row, yet which do not overlap. A plurality of circles 320 are overlapped with each other to form the interior flower shape 330 which is surrounded by a first circle 310. The interior flower shape 330 is formed from the curves of the overlapping circles. FIG. 10 illustrates the design in rubber, and preferably has a height of at least 0.3 mm and each circle having a diameter of 1 mm or more, preferably 1.3 mm or more. Each circle as described in this embodiment has the same diameter.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire having a high contrast design pattern formed of a first and second set of circles, wherein the first set of circles are arranged in a first pattern so that the first set of circles do not overlap with each other and are tangent to each other, wherein a second set of the plurality of circles are arranged in a second pattern so that the second set of circles do not overlap with each other and are tangent to each other, wherein the second set of circles overlap with the first set of circles and wherein each circle has the same diameter.

2. The tire of claim 1 wherein each circle has a flower shaped design is located therein.

3. The tire of claim 2 wherein each of the flower shaped designs is formed from a plurality of overlapping circles.

4. The tire having a high contrast design pattern of claim 1 wherein the high contrast design pattern is located on a sidewall.

5. The tire having a high contrast design pattern of claim 1 wherein the high contrast design pattern is located on a tread.

6. The tire having a high contrast design pattern of claim 1, wherein each circle has a diameter of 1 mm or more.

\* \* \* \* \*